(12) United States Patent
Marshak et al.

(10) Patent No.: US 9,323,459 B1
(45) Date of Patent: Apr. 26, 2016

(54) TECHNIQUES FOR DYNAMIC DATA STORAGE CONFIGURATION IN ACCORDANCE WITH AN ALLOCATION POLICY

(71) Applicant: EMC Corporation, Hopkinton, MA (US)

(72) Inventors: Marik Marshak, Newton, MA (US); Alexandr Veprinsky, Brookline, MA (US); Amnon Naamad, Brookline, MA (US); Joe Murphy, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/636,515

(22) Filed: Mar. 3, 2015

Related U.S. Application Data

(63) Continuation of application No. 12/803,570, filed on Jun. 30, 2010, now Pat. No. 9,003,157.

(51) Int. Cl.
*G06F 12/00* (2006.01)
*G06F 3/06* (2006.01)

(52) U.S. Cl.
CPC ............ *G06F 3/061* (2013.01); *G06F 3/0611* (2013.01); *G06F 3/0629* (2013.01); *G06F 3/0644* (2013.01); *G06F 3/0685* (2013.01)

(58) Field of Classification Search
CPC ... G06F 3/0685; G06F 3/0644; G06F 3/0629; G06F 3/0611
See application file for complete search history.

(56) References Cited

U.S. PATENT DOCUMENTS

| | | | |
|---|---|---|---|
| 6,912,635 B2 * | 6/2005 | Patterson | G06F 3/0601 711/111 |
| 8,006,061 B1 * | 8/2011 | Chatterjee et al. | 711/170 |
| 2009/0063806 A1 * | 3/2009 | Logan et al. | 711/173 |

* cited by examiner

*Primary Examiner* — Kevin Verbrugge
*Assistant Examiner* — Alan Otto
(74) *Attorney, Agent, or Firm* — Muirhead and Saturnelli, LLC

(57) ABSTRACT

Described are techniques for partitioning storage of a data storage system. A plurality of storage groups is selected. Each of the plurality of storage groups includes one or more devices and is associated with an allocation policy including a first threshold specifying one of a minimum or a maximum amount of storage of a first of a plurality of storage tiers. Workload data for the plurality of storage groups is analyzed. Storage of a plurality of storage tiers is partitioned for use by the plurality of storage groups in accordance with criteria. The criteria includes workloads of the plurality of storage groups and the allocation policy associated with each of the plurality of storage groups.

20 Claims, 12 Drawing Sheets

TECHNIQUES FOR DYNAMIC DATA STORAGE CONFIGURATION IN ACCORDANCE WITH AN ALLOCATION POLICY

CROSS-REFERENCE TO RELATED APPLICATIONS

This application is a continuation of U.S. application Ser. No. 12/803,570 filed on Jun. 30, 2010 (pending), which is incorporated by reference herein.

BACKGROUND

1. Technical Field

This application generally relates to data storage, and more particularly to techniques used in connection with data storage configuration.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications. One problem in connection with data storage configuration and management in a multi-tiered storage environment is how to partition the different tiers for use by the different applications.

SUMMARY OF THE INVENTION

In accordance with one aspect of the invention is a method for partitioning storage of a data storage system. A plurality of storage groups is selected. Each of the plurality of storage groups includes one or more devices and is associated with an allocation policy including a first threshold specifying one of a minimum or a maximum amount of storage of a first of a plurality of storage tiers. Workload data for the plurality of storage groups is analyzed. Storage of a plurality of storage tiers is partitioned for use by the plurality of storage groups in accordance with criteria. The criteria includes workloads of said plurality of storage groups and said allocation policy associated with each of said plurality of storage groups. Each of said storage groups may include logical devices of data used by an application. The first threshold may be a maximum threshold specifying a maximum amount of storage of the first storage tier. The allocation policy may include a second threshold that is minimum threshold specifying a minimum amount of storage of the first storage tier. The allocation policy may indicate a storage capacity range of said first storage tier. The storage capacity range may be a range of values from zero up to said maximum amount specified by the first threshold. The partitioning may allocate an amount of said first tier for use by said each storage group which is in the storage capacity range. The plurality of storage tiers may include a first storage tier of one or more flash memory devices and a second storage tier of one or more physical devices having lower performance characteristics than said one or more flash memory devices. Each of the plurality of storage groups may be associated with a priority. The priority may be included in the criteria. The first threshold may be a percentage of a total storage capacity of said each storage group. The first threshold may be a percentage of a total storage capacity of said first storage tier. The first threshold may be an integer indicating an amount of storage units. The allocation policy may be associated with at least two of said plurality of storage tiers and may include at least two maximum thresholds corresponding to said at least two plurality of tiers. The first threshold may be one of the at least two maximum thresholds. A sum of the at least two maximum thresholds for said at least two plurality of tiers may represent a storage capacity which is more than a storage capacity of said each storage group The method may be performed periodically to repartition storage of said plurality of storage tiers of the data storage system among said plurality of storage groups. As a result of said partitioning, data of a first device of a first of said storage groups may be moved from a first of said plurality of storage tiers to a second of said plurality of storage tiers.

In accordance with another aspect of the invention is a computer readable medium comprising code stored thereon for partitioning storage of a data storage system, the computer readable medium comprising code for: selecting a plurality of storage groups, each of said plurality of storage groups including one or more devices and being associated with an allocation policy including a first threshold specifying one of a minimum or a maximum amount of storage of a first of a plurality of storage tiers; analyzing workload data for said plurality of storage groups; and partitioning storage of a plurality of storage tiers for use by said plurality of storage groups in accordance with criteria, said criteria including workloads of said plurality of storage groups and said allocation policy associated with each of said plurality of storage groups. Each of the storage groups may include logical devices of data used by an application. The first threshold may be a maximum threshold specifying a maximum amount of storage of the first storage tier. The allocation policy may indicate a storage capacity range of said first storage tier. The storage capacity range may be a range of values from zero up to said maximum amount specified by the first threshold. The partitioning allocates an amount of said first tier for use by said each storage group which is in the storage capacity range.

In accordance with another aspect of the invention is a system comprising:
a data storage system; and a computer readable medium comprising code stored thereon for partitioning storage of a data storage system, the computer readable medium comprising code for: selecting a plurality of storage groups, each of said plurality of storage groups including one or more devices and being associated with an allocation policy including a first threshold specifying one of a minimum or a maximum amount of storage of a first of a plurality of storage tiers; analyzing workload data for said plurality of storage groups; and partitioning storage of a plurality of storage tiers for use by said plurality of storage groups in accordance with criteria, said criteria including workloads of said plurality of storage groups and said allocation policy associated with each of said plurality of storage groups.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
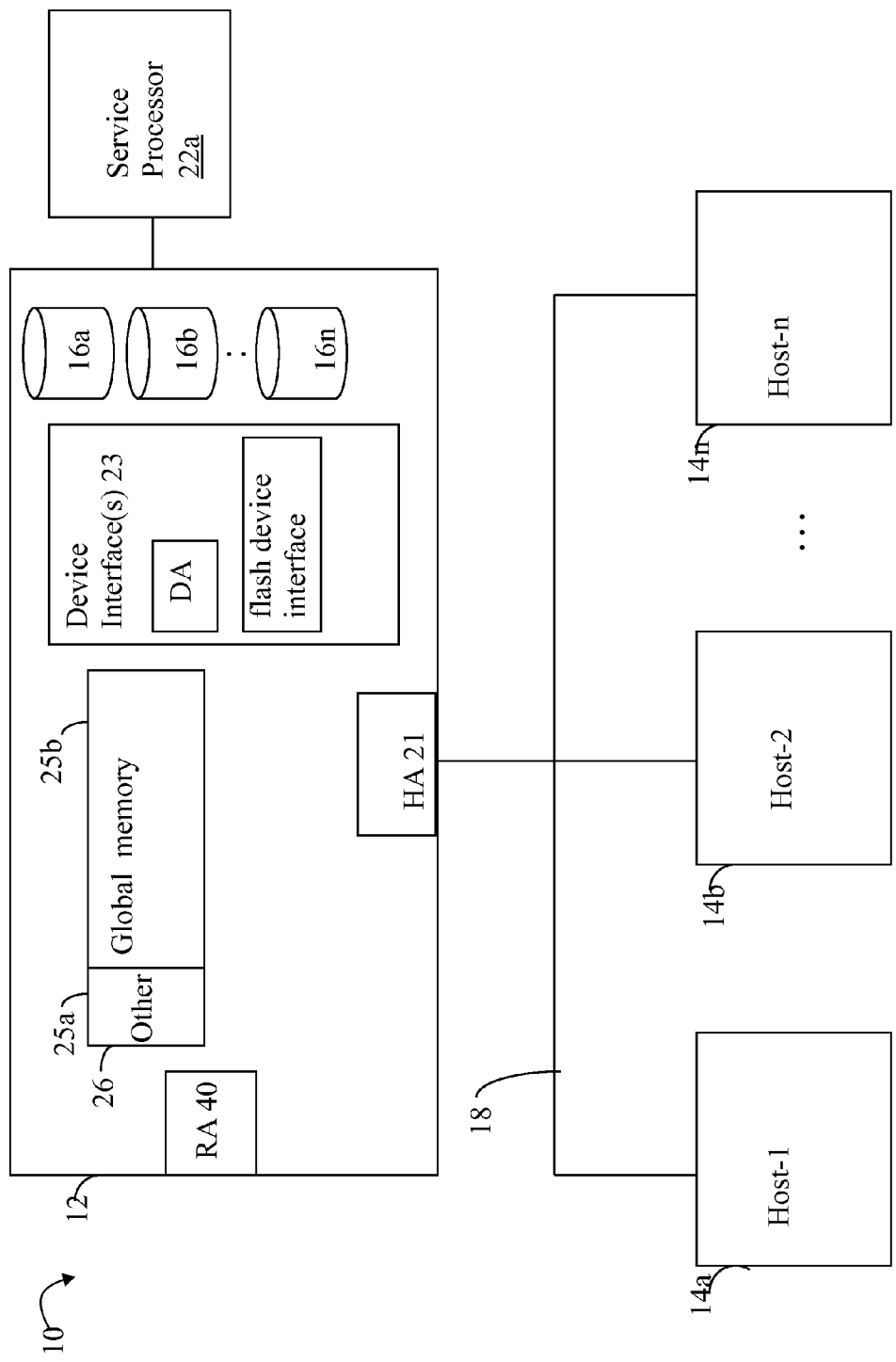
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

Figure 2:
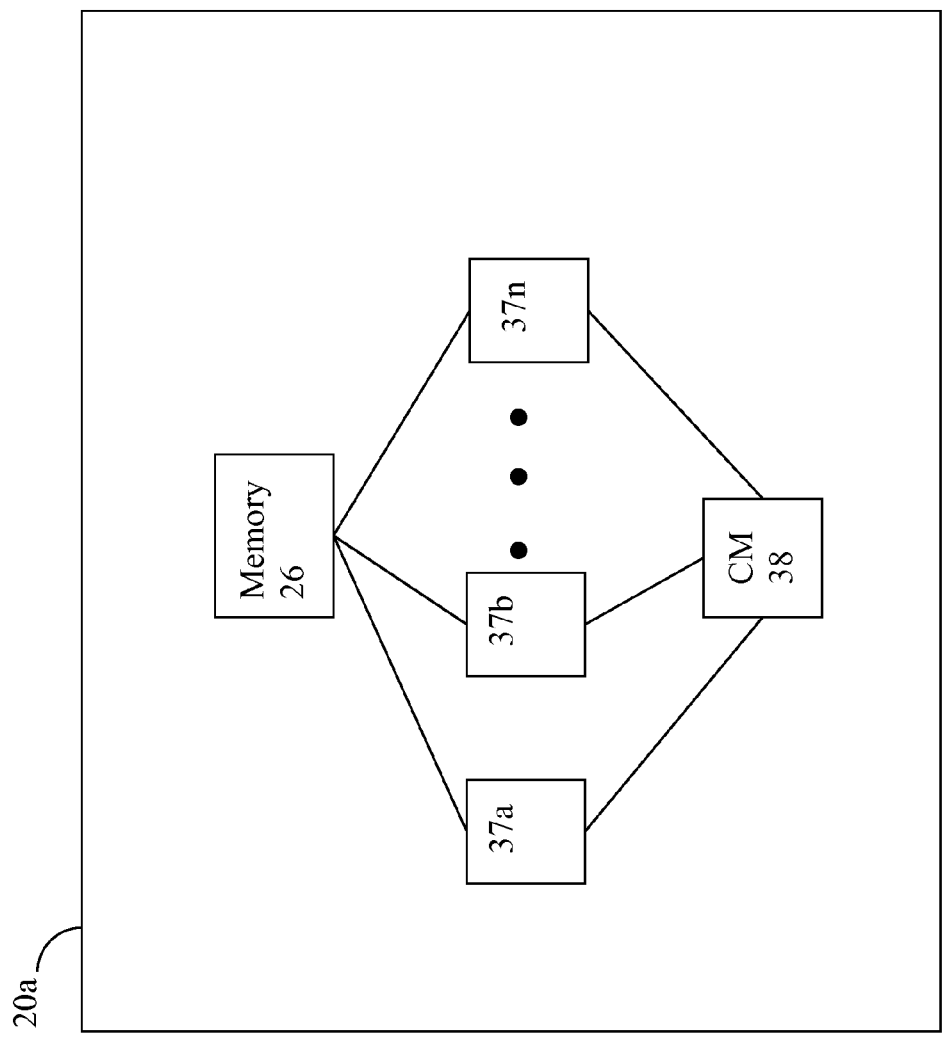
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26.

Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC drive, a SATA (Serial Advanced Technology Attachment) drive), and the like. Data protection may specify a type or level of data storage protection such, for example, as a particular RAID level (e.g., RAID1, RAID-5 3+1, RAIDS 7+1, and the like). Performance characteristics may relate to different performance aspects of the physical storage devices of a particular type or technology. For example, there may be multiple types of FC drives based on the RPM characteristics of the FC drives (e.g., 10K RPM FC drives and 15K RPM FC drives) and FC drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and other tier definitions may be specified in accordance with techniques herein.

Figure 3:
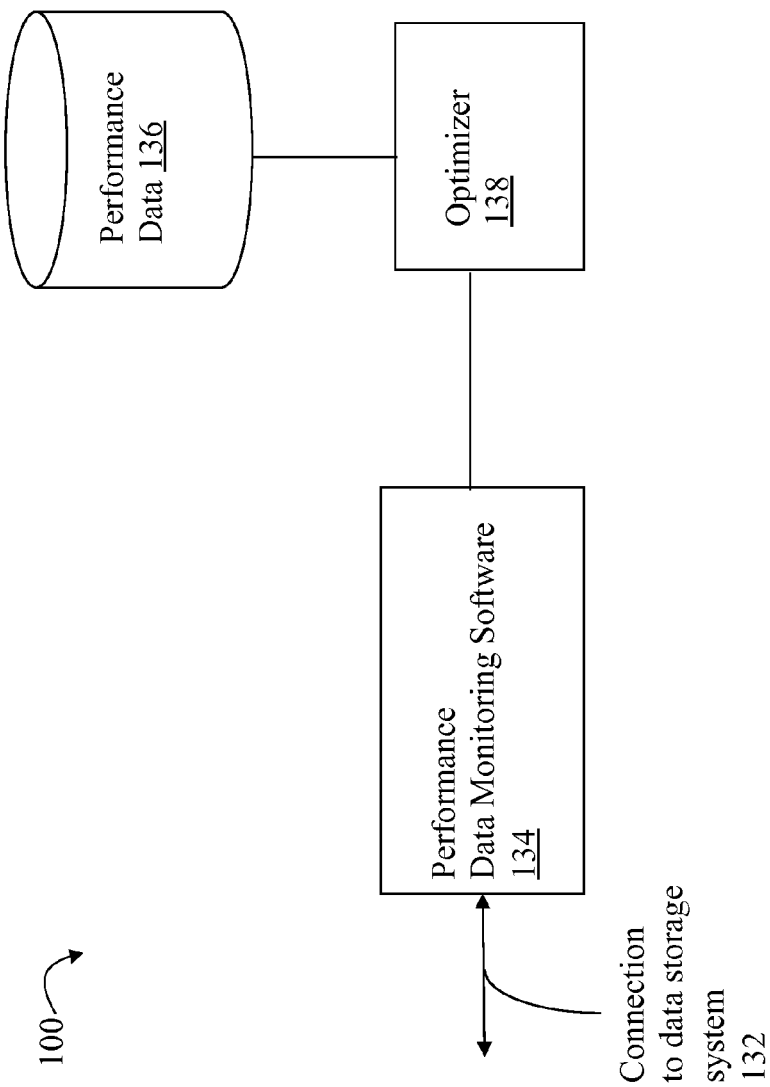
FIG. 3 is an example representing components that may be included in a service processor in an embodiment in accordance with techniques herein.

Referring to FIG. 3, shown is an example 100 of software that may be included in a service processor such as 22a. It should be noted that the service processor may be any one of a variety of commercially available processors, such as an Intel-based processor, and the like. Although what is described herein shows details of software that may reside in the service processor 22a, all or portions of the illustrated components may also reside elsewhere such as, for example, on any of the host systems 14a 14n.

Included in the service processor 22a is performance data monitoring software 134 which gathers performance data about the data storage system 12 through the connection 132. The performance data monitoring software 134 gathers and stores performance data and forwards this to the optimizer 138 which further stores the data in the performance data file 136. This performance data 136 may also serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 36 may be used by the optimizer to determine metrics described and used in connection with techniques herein. The optimizer may access the performance data, for example, collected for a plurality of LVs when performing a data storage optimization. The performance data 36 may be used in determining a workload for one or more physical devices, logical devices or volumes (LVs) and the like. The workload may also be a measurement or level of "how busy" a device is, for example, in terms of I/O operations (e.g., I/O throughput such as number of I/Os/second, and the like). The optimizer 38 may perform processing of the techniques herein set forth in following paragraphs to determine how to allocate or partition physical storage in a multi-tiered environment for use by multiple applications. The optimizer 38 may also perform other processing such as, for example, to determine what particular LVs to store on physical devices of a particular tier, evaluate when to migrate or move data between physical drives of different tiers or within the same tier, and the like. It should be noted that the optimizer 138 may generally represent one or more components that perform processing as described herein as well as one or more other optimizations and other processing that may be performed in an embodiment.

Described in following paragraphs are techniques that may be performed to determine how to allocate or partition physical storage of multiple storage tiers for use by a plurality of applications. Such a determination may be made in accordance with one or more criteria including an allocation policy. The criteria may also include, for example, a priority, one or more performance metrics used to evaluate workloads, and the like. As described in following paragraphs, one embodiment may use an allocation policy specifying an upper limit or maximum threshold of storage capacity for each of one or more tiers for use with an application. The partitioning of physical storage of the different storage tiers among the applications may be initially performed using techniques herein in accordance with the foregoing thresholds of the application's allocation policy. The techniques herein may performed at subsequent times during operation of the data storage system to re-evaluate the current partitioning of the different storage tiers amongst the applications. The techniques herein may use other criteria, such as application and/or device workload (e.g., such as may be determined based on observed performance measurements), to determine the partitioning. Criteria, such as the workload, may change over time and thus so may the partitioning. However, any physical storage allocation partitioning of the multiple storage tiers for applications may be subject to the thresholds of the associated allocation policies. Use of maximum thresholds allows for flexibility in that it does not result in allocating or reserving a fixed amount of resources. As such, an embodiment may perform other optimizations such as based on application workload and may vary the amount of physical storage of the multiple tiers allocated for use by an application subject to any such maximum threshold.

In accordance with techniques herein, an embodiment may determine amounts of the different storage tiers used by an application subject to the allocation policy and possibly other criteria using a variety of different techniques. As described in following paragraphs, such criteria may also include a priority associated with an application and its data. Such criteria may also include one or more performance metrics indicating a workload of the application. For example, an embodiment may determine one or more performance metrics using collected or observed performance data for a plurality of LVs used by the application. Thus, the partitioning of the different storage tiers among multiple applications may also take into account the workload or how "busy" an application is. There may be a tendency to use the storage tiers having higher performance characteristics (e.g., those tiers of physical drives providing higher I/O throughput, having lower latency times, and the like) for those applications having the higher workloads. However, an embodiment may also perform the foregoing subject to other criteria, such as an application's priority, so that a single application may not consume all the capacity, or exceed specified limits of, a high performance tier. For example, it may be undesirable to have a single application consume all of the flash devices in the highest performance tier thereby causing a severe performance degradation of all other applications. The priority may also be used, for example, as an additional criteria to assist in partitioning storage tiers among multiple applications having substantially the same workloads.

As an example, the techniques herein may be described with reference to a storage environment having three storage tiers—a first tier of only flash drives in the data storage system, a second tier of only FC drives, and a third tier of only SATA drives. In terms of performance, the foregoing three tiers may be ranked from highest to lowest as follows: first, second, and then third. The lower the tier ranking, the lower the tier's performance characteristics (e.g., longer latency times, capable of less I/O throughput/second, and the like). Generally, different types of physical devices or physical drives have different types of characteristics. There are different reasons why one may want to use one storage tier and type of drive over another depending on criteria, goals and the current performance characteristics exhibited in connection with performing I/O operations. In this example, the first tier of flash drives may be characterized as cost effective in terms of performance for data access and retrieval. The third tier of SATA drives may be characterized as cost effective in terms of storage capacity. For example, flash drives of the first tier may be a best choice or candidate for storing LVs which may be characterized as I/O intensive or "busy" thereby experiencing a high rate of I/Os to frequently access the physical storage device containing the LV's data. However, flash drives tend to be expensive in terms of storage capacity. SATA drives may be a best choice or candidate for storing LVs requiring a large storage capacity and which are not I/O intensive with respect to access and retrieval from the physical storage device. The second tier of FC drives may be characterized as "in between" flash drives and SATA drives in terms of cost/GB and I/O performance. Thus, in terms of relative performance characteristics, flash drives may be characterized as having higher performance than both FC and SATA, and FC may be characterized as having a higher performance than SATA.

As may be observed with respect to data storage systems, a typical or general usage characteristic is that a small amount of the storage capacity tends to be associated with a large amount of the I/O activity, such as read and write operations. For example, 80% of all I/Os may be associated with 20% of the total storage capacity. Since flash drives of the first tier are the most expensive of all tiers in terms of dollars/GB, processing may be performed to determine which of the LVs are characterized as most I/O intensive and therefore may be good candidates to have their data stored on flash drives. Similarly, the second most I/O intensive LVs may be good candidates to store on FC drives of the second tier and the least I/O intensive LVs may be good candidates to store on SATA drives of the third tier. As such, workload for an application may be determined using some measure of I/O intensity, performance or activity (e.g., I/O throughput/second, percentage of read operation, percentage of write operations, etc.) of each LV used for the application's data. Some measure of workload may be used as a factor or criterion in combination with others described herein for partitioning an amount of physical storage of the different storage tiers for use by each application.

Figure 4:
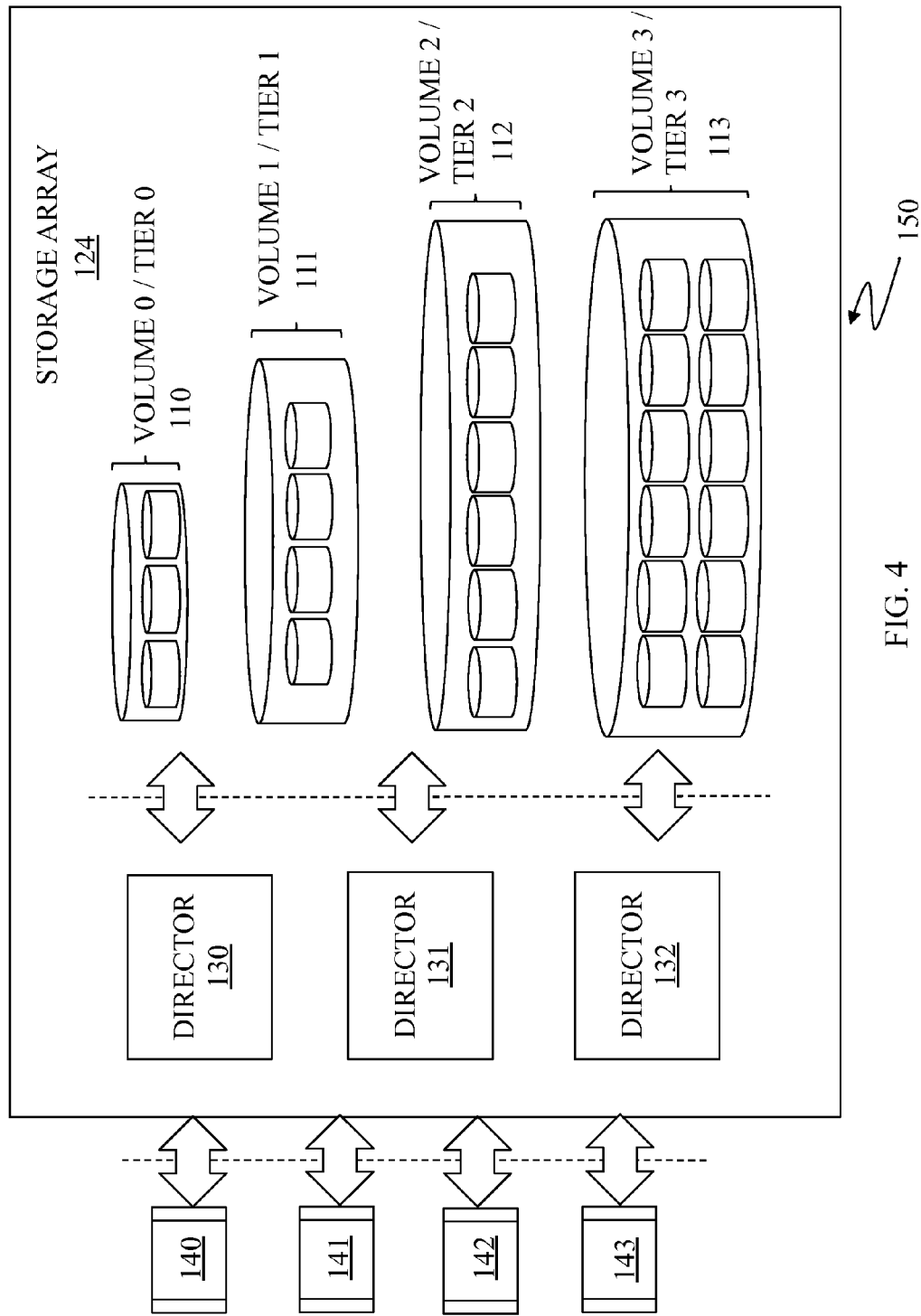
FIGS. 4, 5A and 5B are examples illustrating a data storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a storage array 124 having multiple directors 130-132 and multiple storage volumes (LVs, logical devices or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs, among other known types of storage devices.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies to transparently automate the control, placement, and movement of data within a storage system based on business needs. The techniques herein may be used to determine amounts or allocations of each storage tier used by each application. Other suitable techniques may be used to determine more specifically which of an application's data to locate in possibly different tiers allocated for use by the application. At a later point in time, the techniques herein may be used to repartition the storage tiers among the different applications. In accordance with such repartitioning, data may also be moved between tiers.

Figure 5A:
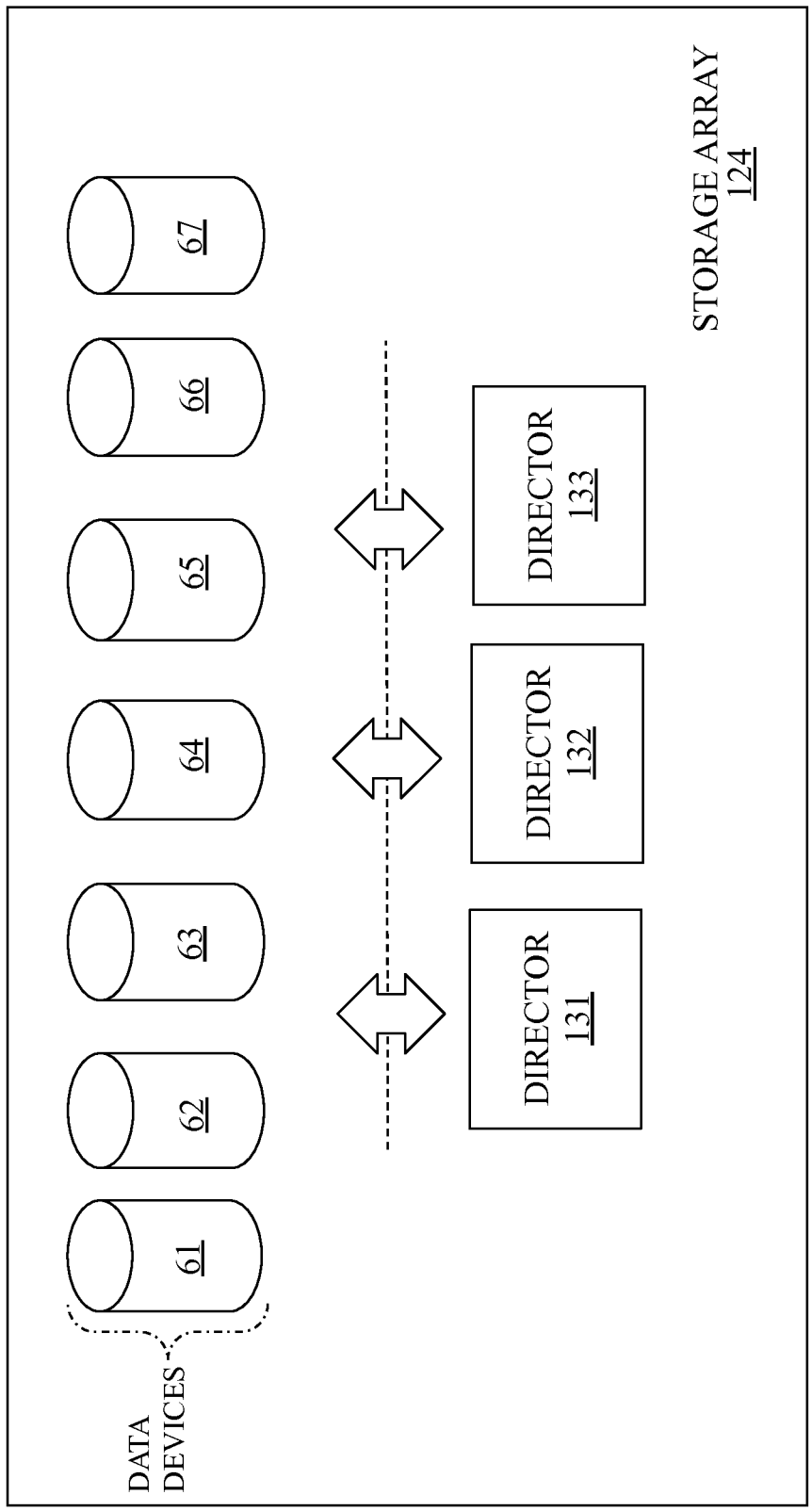

Referring to FIG. 5A, shown is a schematic diagram of the storage array 124 as including a plurality of data devices 61-67 communicating with directors 131-133. The data devices 61-67 may be implemented as logical devices like standard logical devices (also referred to as thick devices) provided in a Symmetrix® data storage device produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more of the disk drives 42-44. Thus, for example, the data device section 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-68 may be sections of one data device.

Figure 5B:
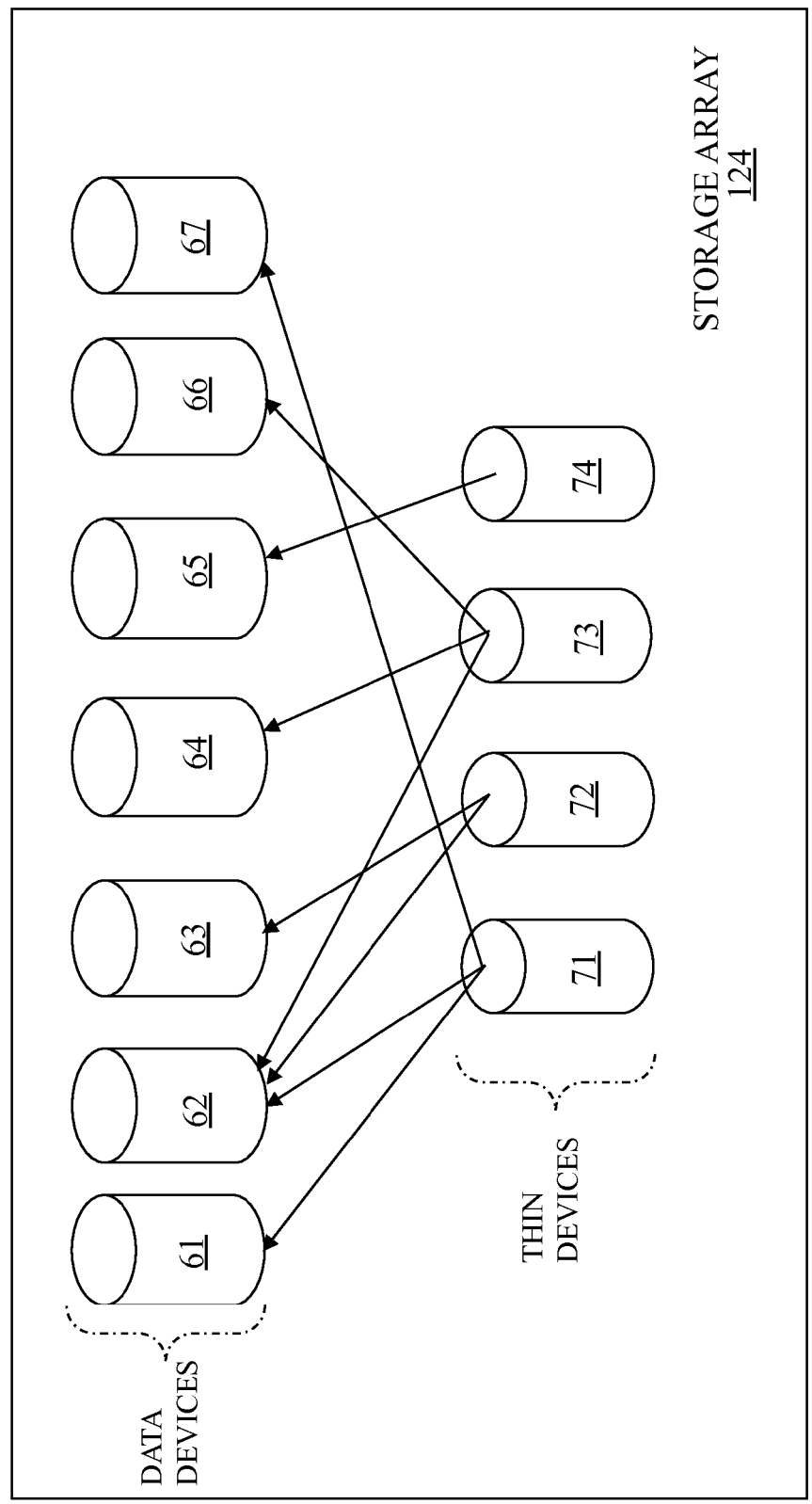

Optionally, as shown in FIG. 5B, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof). Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, and U.S. patent application Ser. No. 11/903,869, filed Sep. 25, 2007, DATA DE-DUPLICATION USING THIN PROVISIONING, Veprinsky et al., both of which are incorporated by reference herein.

As discussed elsewhere herein, the data devices 61-67 (such as LVs or other logical devices) may be associated with physical storage areas (e.g., disk drives, tapes, solid state storage, etc.) having different characteristics. In various embodiments, the physical storage areas may include multiple tiers of storage in which each sub-tier of physical storage areas and/or disk drives may be ordered according to different characteristics and/or classes, such as speed, technology and/or cost. The devices 61-67 may appear to a host coupled to the storage device 24 as a logical volume (logical device) containing a contiguous block of data storage, as discussed herein. Accordingly, each of the devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume. It is also noted that, in other embodiments, multiple logical devices or LVs may be concatenated and appear to the host as a single metavolume.

In accordance with techniques herein, an embodiment may allow for locating all of the data of a single logical portion or entity in a same tier or in multiple different tiers depending on the logical data portion or entity. For example, in one embodiment, all data associated with a single LV or logical device visible to the host may be located in the same tier. A metavolume may be accessible to the host as a single logical entity and an embodiment in accordance with techniques herein may locate all data of a single metavolume in the same tier. In an embodiment including thin devices, the techniques herein may be used where different portions of data of a single thin device may be located in different storage tiers. For example, a thin device may include two data portions and a first of these two data portions may be identified as a "hot spot" of high I/O activity (e.g., having a large number of I/O accesses such as reads and/or writes per unit of time) relative to the second of these two portions. As such, an embodiment in accordance with techniques herein may have added flexibility in that the first portion of data of the thin device may be located in a different higher performance storage tier than the second portion. For example, the first portion may be located in a tier comprising flash devices and the second portion may be located in a different tier of FC or SATA drives.

For simplicity of illustration, examples set forth in following paragraphs may refer to LVs or logical devices. However, other logical data entities such as metavolumes and thin devices may also be used in connection with techniques herein.

Figure 6:
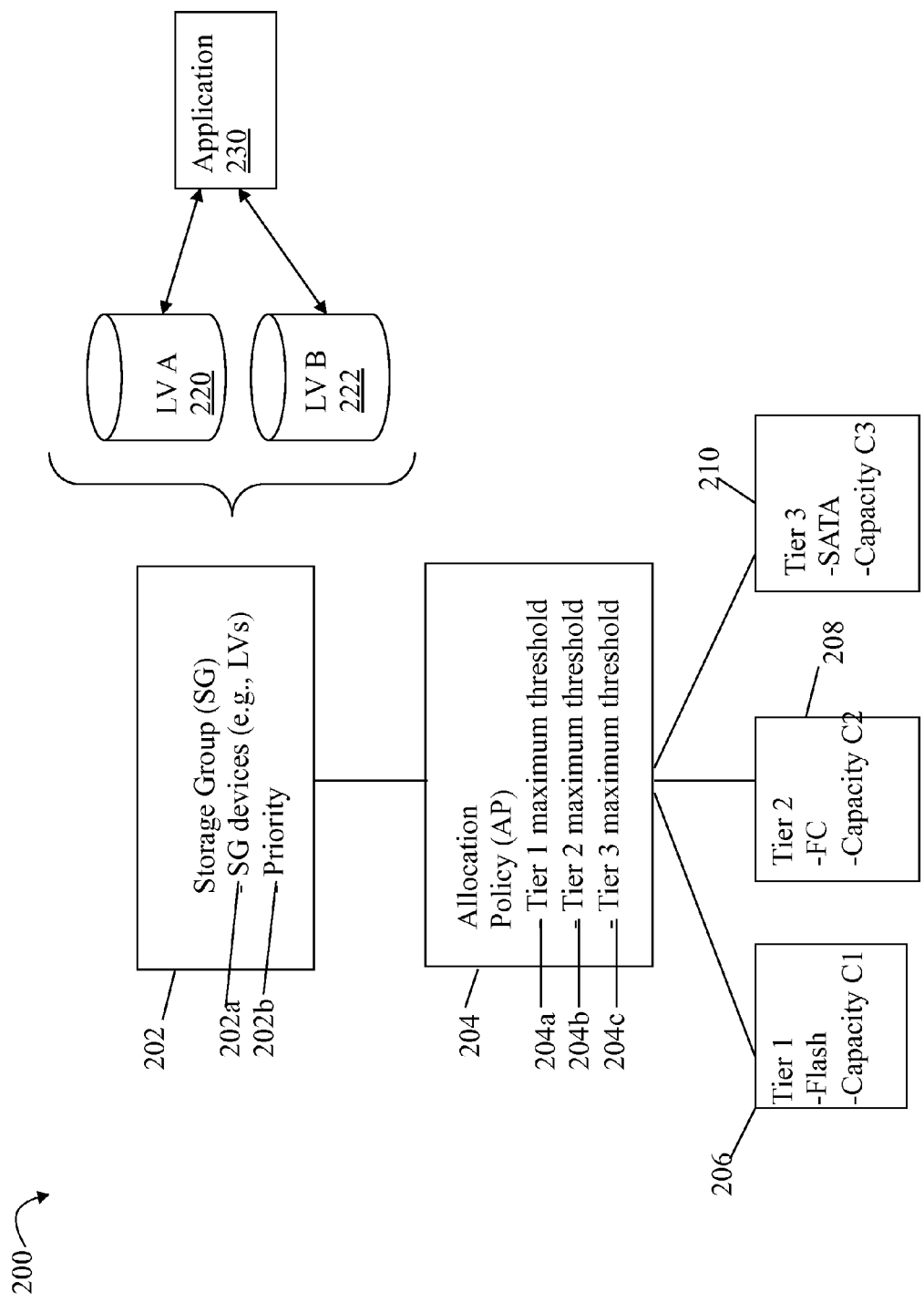
FIGS. 6 and 7 are examples illustrating a storage group, allocation policy and associated storage tiers in an embodiment in accordance with techniques herein.

Referring to FIG. 6, shown is an example illustrating information that may be defined and used in connection with techniques herein. The example 200 includes multiple storage tiers 206, 208, and 210, an allocation policy (AP) 204, and storage group (SG) 202. The SG 202 may include one or more LVs, such as LV A 220 and LV B 222, used by an application 230. The application 230 may execute, for example, on one of the hosts of FIG. 1. The techniques herein may be used to determine how to partition physical storage of the multiple storage tiers 206, 208 and 210 for use in storing or locating the application's data, such as data of the LVs 220 and 222. It should be noted that the particular number of tiers, LVs, and the like, should not be construed as a limitation. An SG may represent a logical grouping of LVs used by a single application although an SG may correspond to other logical groupings for different purposes. An SG may, for example, correspond to LVs used by multiple applications.

Each of 206, 208 and 210 may correspond to a tier definition as described elsewhere herein. Element 206 represents a first storage tier of flash drives having a tier capacity C1. Element 208 represents a first storage tier of FC drives having a tier capacity C2. Element 210 represents a first storage tier of SATA drives having a tier capacity C3. The AP 204 may be associated with one of more SGs such as SG 202. The AP 204 specifies, for an associated SG, a capacity upper limit or maximum threshold for one or more storage tiers. Each such threshold may identify an upper bound regarding an amount of storage that may be allocated for use by the associated SG. The AP 204 may be associated with one or more of the storage tiers 206, 208 and 210 that may be defined in a multi-tier storage environment. The AP 204 in this example 200 includes threshold 204a identifying a maximum threshold for tier1, threshold 204b identifying a maximum threshold for tier2, and threshold 204c identifying a maximum threshold for tier3. The SG 202 may be based on an SG definition identifying 202a the logical devices, such as LVs included in the SG, and an application or SG priority 202b. The priority 202b may be user-specified and may identify a relative importance or priority of the application 230 having data of the SG 202. The priority 202b may be one of a plurality of defined priority levels such as LOW, MEDIUM, and HIGH indicating a relative priority of this application 230 to other applications that may have data stored on devices of the same storage system. The priority may be used along with other criteria in accordance with techniques herein to partition the capacity of the multiple storage tiers for use by the multiple applications. Examples are described in more detail elsewhere herein.

In connection with techniques herein, the maximum thresholds 204a, 204b and 204c each represent an upper bound of a storage capacity. The techniques herein may be used to partition less than the amount or capacity represented by such thresholds. An amount of physical storage of a tier allocated for use by an application is allowed to vary up to that threshold in accordance with other criteria associated with the application such as, for example, varying application workload. Thus, at a first point in time, an optimizer may analyze current workloads of the various applications and may be allowed to vary the amount or partitioning of storage capacity of each tier used by each application subject to any such maximum thresholds of the associated APs. The optimizer may vary such partitioning based on workload and possibly other criteria when performing a cost benefit analysis. At a second point in time, the workloads and possibly other criteria for the applications may change and the optimizer may repartition the storage capacity used by each application subject to the maximum thresholds of the associated APs. Thus, the optimizer has additional flexibility in partitioning capacities of the storage tiers for application data by being allowed to consider, at a single point in time, different partitioning options evaluated as "best" and subject to the AP thresholds. The foregoing is in contrast to hard or fixed capacities. Thus, the thresholds allow a system to perform optimizations based on workload changes subject to any thresholds without having a requirement of reserving a total capacity indicated by the threshold. Thus, the optimizer has additional flexibility in resource allocations in accordance with techniques herein and may consider various candidate partitioning options at a single point in time.

An embodiment may include definitions for the different SGs, APs, tiers and associations therebetween. Such information may be stored in a memory, data container, or other location on the data storage system, or otherwise accessible to the data storage system, for use in connection with techniques herein.

In an embodiment, each SG may include one or more thick devices or one or more thin devices. Various restrictions for a given SG, such as whether an embodiment allows an SG to include both thick and thin devices, may vary.

Figure 7:
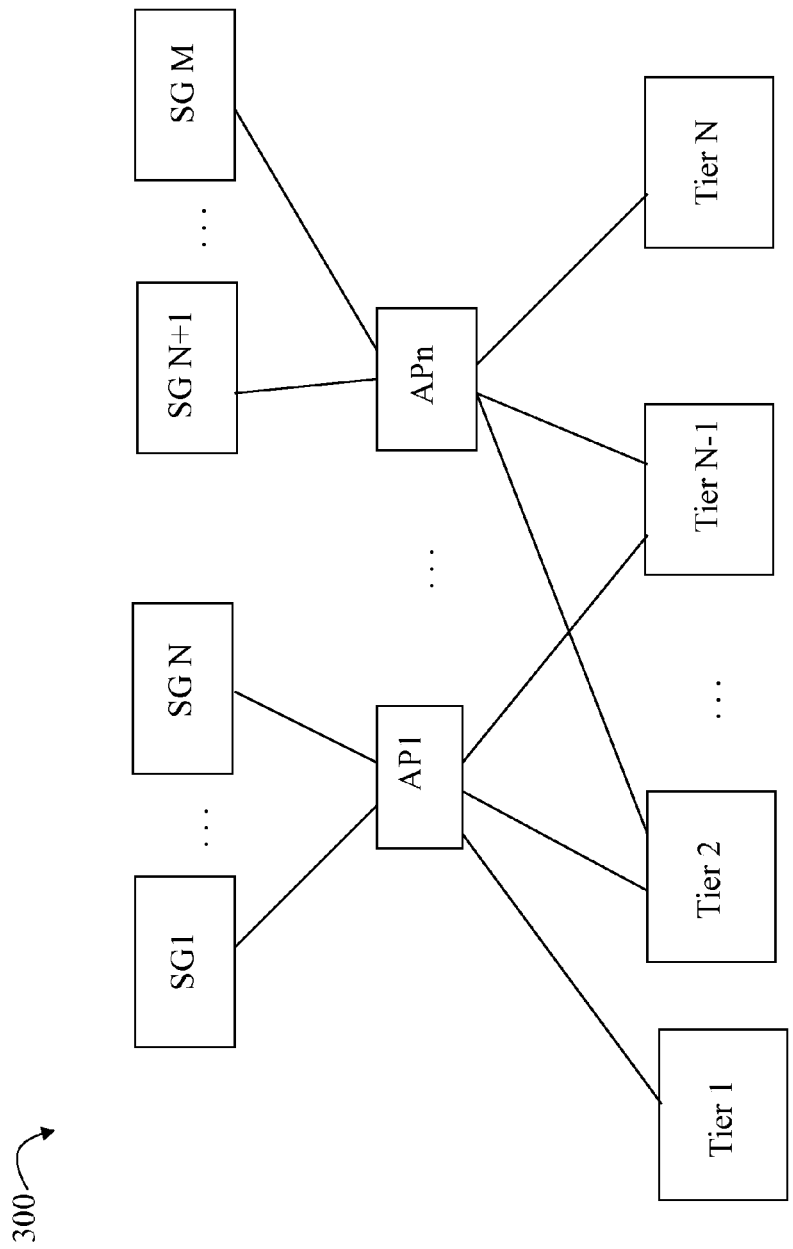

Referring to FIG. 7, shown is an example which more generally illustrates different associations between SGs, APs and tiers in an embodiment in accordance with techniques herein. The example 300 illustrates that an embodiment may have multiple storage tiers (e.g., tiers 1-N), multiple APs (e.g, AP1-N), and multiple SGs (e.g., SG 1-M). Each AP may be associated with one or more of the storage tiers. Each AP may also be associated with different tiers than other APs. For example, APn is associated with Tier N but AP1 is not. For each tier associated with an AP, the AP may define a maximum threshold or capacity as described in connection with FIG. 6. Each AP may be associated with one or more SGs. For example SGs1-N may be associated with a same AP1, and SGs N+1 through M may be associated with a same APn.

Figure 8:
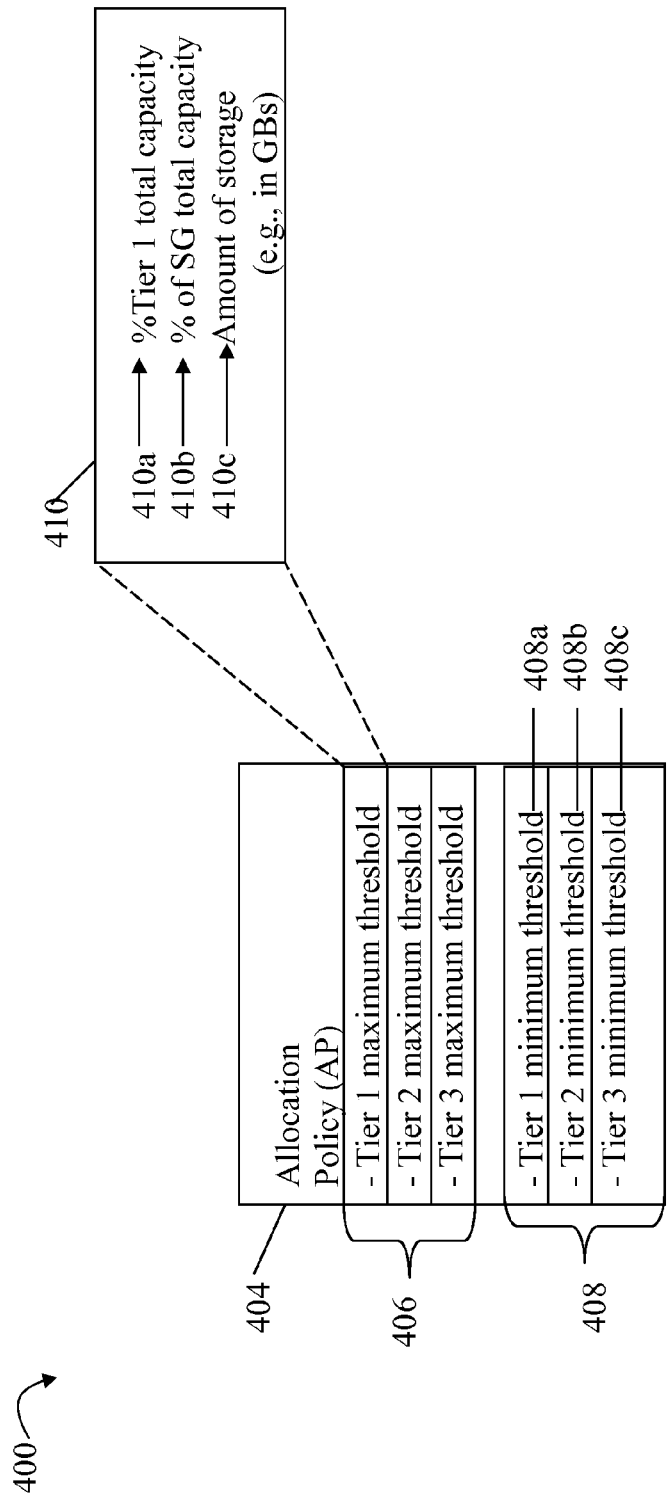
FIG. 8 is an example illustrating an allocation policy in more detail in an embodiment in accordance with techniques herein.

Referring to FIG. 8, shown is an example illustrating in more detail information that may be included in an AP in accordance with techniques herein. The AP 404 may include maximum thresholds 406 for the associated tiers as described above. Additionally, an embodiment may also include minimum thresholds 408 for the associated tiers. The minimum thresholds 406 may specify a lower bound or minimum amount of storage of associated tiers that may be allocated for use by an associated SG at a point in time. Thus, an embodiment in which an AP uses both thresholds 406 and 408 may partition the storage of the tiers subject to both sets of thresholds. For example, an SG associated with AP 404 may be allocated an amount of tier1 physical storage between the tier 1 maximum threshold and the tier 1 minimum threshold, inclusively. The minimum and maximum threshold for a tier may indicate a range of different candidate storage capacities that may be selected in accordance with techniques herein.

Each of the thresholds of 406, 408 may have any one of a variety of different forms. Element 410 represents some of the ways in which each such threshold may be expressed. For example, each maximum or minimum threshold of an AP may be expressed as a percentage or portion of tier total storage capacity 410a. as a percentage or portion of the SG total capacity 410b (e.g. as a percentage based on the total storage capacity consumed or used by the application), or as an integer indicating an amount or quantity of storage 410c (e.g., indicating a number of bytes or other number of storage units).

It should be noted that if tier maximum thresholds are represented relative to SG total capacity as in 410b, the sum of the percentages for all the associated tiers should be 100% or more. The sum of the maximum thresholds having form 410b may be more than 100% in order to allow for further flexibility in partitioning the multiple storage tiers as illustrated in following paragraphs. If tier maximum thresholds are represented relative to tier total capacity as in 410a or as an absolute amount as in 410c, the total or sum of maximum thresholds across all tiers of an SG should be at least that amount which is actually consumed by the SG. Thus, as storage consumed by the SG or application increases, so may the percentages of 410a and/or amounts of 410c for a given AP. To further illustrate, an SG may include LV1 which is 10 GB (gigabytes) and LV2 which is 90 GB. If tier 1 maximum threshold=50% and such threshold is with respect to the SG total capacity (e.g., 410b), then the maximum threshold for tier 1 storage for the SG is 50 GBs (50% of 10 GB+90Bs) and a partitioning of the storage tiers may be made so long as no more than 50 GB of tier1 storage is used for storing data of SG1. If tier 1 maximum threshold=50% and such threshold is with respect to the tier 1 total capacity, assuming tier 1 has a storage capacity of 300 GBs, then the maximum threshold for tier 1 storage for the SG is 150 GBs (50% of 300 GBs) and a partitioning of the storage tiers may be made so long as no more than 150 GB of tier1 storage is used for storing data of SG1. If minimum thresholds are specified for a tier, the total capacity of the tier should be at least that as represented by the sum of the minimum thresholds for that tier across all SGs.

It should be noted that the thresholds of 406, 408 may be determined in a variety of different ways such as, for example, manually by a user, automatically selected using software, and the like.

Figure 9:
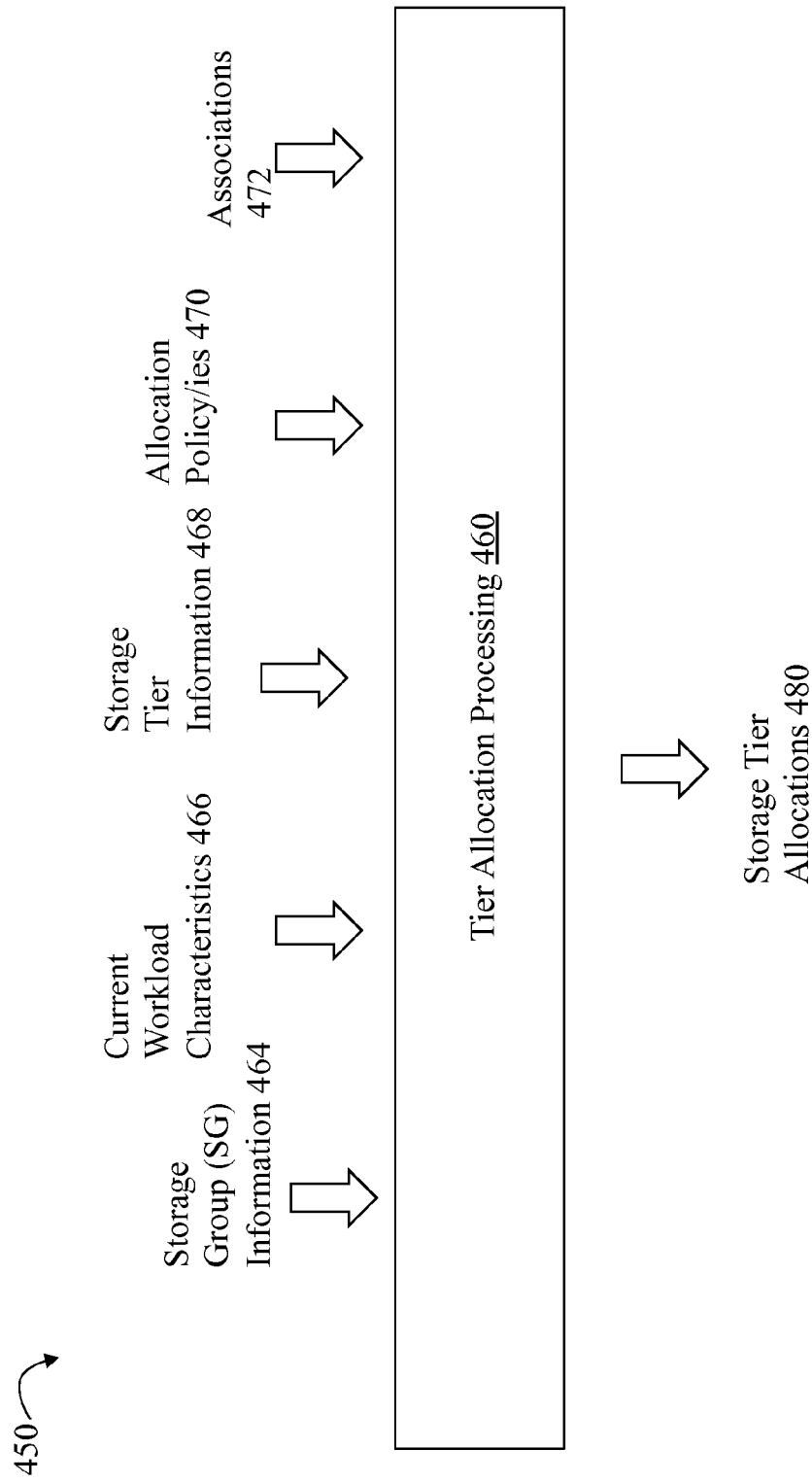
FIG. 9 is an example illustrating inputs and outputs of tier allocation processing in an embodiment in accordance with techniques herein.

Referring to FIG. 9, shown is an example representing the different inputs that may be used in an embodiment in partitioning the multiple storage tiers for use by the different applications in accordance with techniques herein. The example 450 includes a tier allocation processing module or component 460 that may take as inputs SG information 464, current workload characteristics 466, storage tier information 468, allocation policies 470 and associations 472 (e.g., between different APs and SGs, APs and tiers). As an output, module 460 may produce storage tier allocations 480 for each SG of 464.

Element 464 may represent information of the one or more SGs for which partitioning of 460 is performed. The SG information 464 may include, for each of 464, an SG priority and which LVs or other logical devices are included in the SG. Element 466 may include information indicating the current workload of each SG (e.g., each LV of the selected SGs 464). As described elsewhere herein, the current workload may be based on actual observed performance data analyzed to determine how busy the different LVs and/or SGs are. For example, such information of 466 may include an average number of I/O operations/unit of time (e.g., I/O throughput), latency time, response time, service time, and the like. Element 468 may include a total storage capacity of each storage tier. Element 470 may include AP information such as the maximum and/or minimum thresholds for each tier of the AP. Element 472 may include an indication of what AP is associated with what one or more SGs and what AP is associated with what one or more tiers. Element 480 may have any one of a variety of different forms and formats. For example, element 480 may generally be expressed in any one of the forms of the thresholds as in 410 of FIG. 8. For example, element 408 may indicate, for each SG of 464 and each storage tier, an absolute amount of storage, a percentage relative to each tier's storage capacity, or a percentage relative to the total SG storage capacity.

It should be noted that devices included in the SGs of 464 may be candidates to move between different storage tiers based on the AP associated with each SG. For example, the output 480 may be used by the optimizer to generate one or more possible ways in which the storage tiers may be allocated for use by the SGs. Additionally, for each such way in which the tiers may be partitioned, the optimizer may consider one or more possible plans for location of LV data so that one or more LVs of the SGs may have their data relocated or moved between tiers. Additionally, different techniques for optimization may be performed within each storage tier.

Figure 10:
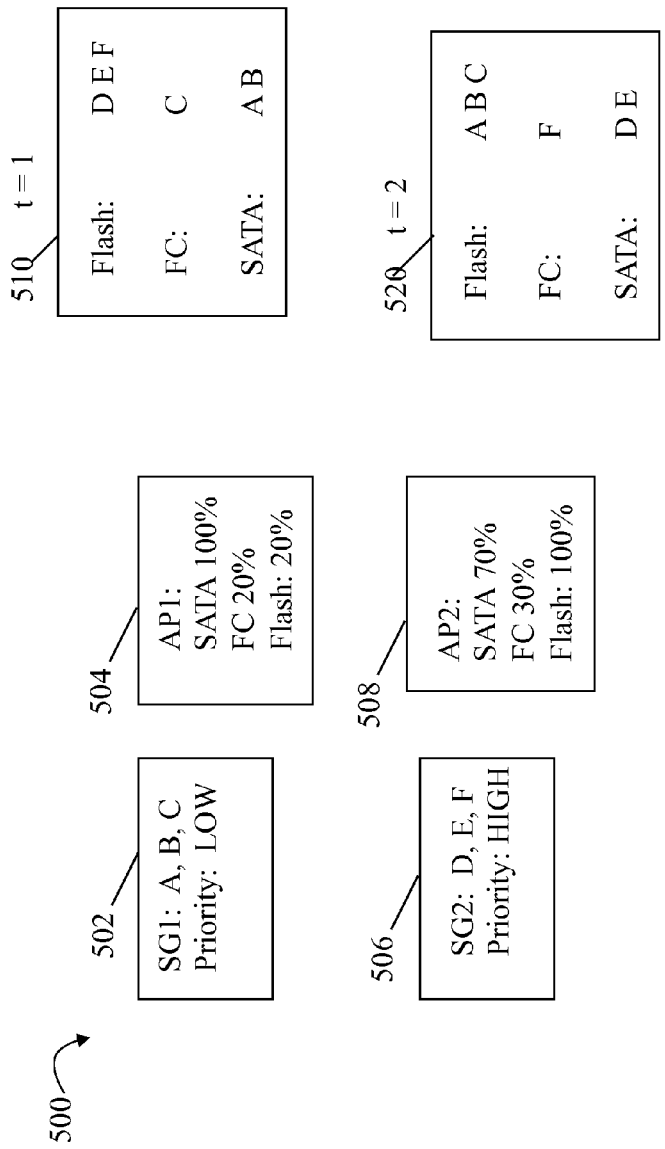
FIG. 10 is an example illustrating use of techniques herein in an embodiment.

Referring to FIG. 10, shown is an example illustrating use of the techniques herein. In the example 500, there may be 3 storage tiers (e.g., tier 1=flash, tier 2=FC, tier 3=SATA) as described in FIG. 6. Each SG may have one of the following 3 priorities in increasing order: LOW, MEDIUM, HIGH. There may a first SG 502 of LVs A, B and C with a priority of LOW, and a second SG 506 of LVs D, E and F with a HIGH priority. A first AP1 504 is associated with SG 1 502 and indicates the following maximum thresholds as percentages of SG storage capacity for each tier: SATA 100%, FC 20% and Flash 20%. Element 504 includes percentages of more than 100% to allow the optimizer flexibility in storage tier allocation. For example, the AP 1 504 indicates that SG1 may have all of its data (100%) stored on SATA drives of tier 3. However, if additional storage in tier 1 and/or tier 2 is available (e.g., such as not in use by another SG's data having a higher workload than SG1), then locate up to 20% of SG1's data in each of tier 1 and tier 2. Thus, the optimizer has flexibility in partitioning the storage tiers and may consider options where the data of SG1 is placed on tier 1 and/or tier 2 storage without requiring reserving a fixed amount of tier 1 and/or tier 2 storage capacity for use by SG1. The optimizer may consider storage tier partitioning solutions where all SG1's data is located on SATA, as well as other possible partitioning solutions where up to 20% of SG1's data is located in each of tier 1 and/or tier 2. In other words, AP1 504 may be characterized as specifying a range of possible partitioning solutions including a first having a minimum performance level characteristic where all SG 1 data is located in SATA to a second having a maximum performance level characteristic where 20% of SG1 is located on flash, 20% of SG1 is located on FC devices, and 60% is located on SATA devices. A second AP2 508 is associated with SG 2 506 and indicates the following maximum thresholds as percentages of SG storage capacity for each tier: SATA 70%, FC 30% and Flash 100%. Element 508 includes percentages of more than 100% to allow the optimizer flexibility in storage tier allocation. For example, the AP2 508 indicates that SG2 may have 70% of its data stored on SATA drives of tier 3 and 30% of its data on tier2 FC drives. However, if additional storage in tier 1 is available (e.g., such as not in use by another SG's data having a higher workload than SG1), then locate up to 100% of SG2's data in tier 1 flash. Thus, the optimizer has flexibility in partitioning the storage tiers and may consider options where the data of SG2 is placed on tier 1 storage without requiring reserving a fixed amount of tier 1 storage capacity for use by SG2. The optimizer may consider storage tier partitioning solutions where 70% of SG1's data is located on SATA and 30% on FC, as well as other possible partitioning solutions where up to 100% of SG1's data is located in tier 1. In other words, AP2 508 may be characterized as specifying a range of possible partitioning solutions including a first having a minimum performance level characteristic (e.g., such as based on expected performance given the characteristics associated with each tier) where 70% of SG 1 data is located in SATA and 30% on FC to a second having a maximum performance level characteristic where 100% of SG1 is located on flash. As described elsewhere herein in more detail, the partitioning solution selected may vary with different criteria evaluated at a point in time such as with the relative workloads of devices of SG1, SG2 and others, different SG priorities, and the like. In connection with the foregoing, the optimizer may determine a performance level characteristic for a possible partitioning solution by determining an expected performance for a SG given the performance characteristics (e.g., latency time, I/O throughput capabilities and the like) associated with the drives of each tier.

To further illustrate, assume the system includes only SG1 and SG2 of the example 500. At time t=1, let the workload of SG1 be determined as substantially the same as the workload of SG2. The system may use current workload and the priority associated with each of SG1 and SG2 to determine storage tier partitioning. Since the current workload of both are about the same (e.g., within some specified limit or threshold), each SG's priority may be used as a deciding factor in storage tier partitioning. In this case, SG2 has a HIGH priority and SG1 has a LOW priority. Storage may be partitioned as illustrated in 510 where all of SG2's data (e.g, LVs D, E and F) is located all in flash and all of SG1's data (e.g., LVs A, B and C) is located in FC and SATA. SG2 has its data located on storage tier devices in accordance with a maximum performance characteristic possible given AP1 504 where all SG2 data is located in flash. SG1 may have its data location in the different storage tiers determined after satisfying SG2's placement. In this example, there may be no further available flash storage capacity after placement of SG2 in flash. However, there is a sufficient storage capacity in FC to hold the maximum of 20% of SG2 (as indicated in AP1 504) with the remainder of SG2 located in SATA.

At a later point in time, t=2, assume SG2's devices (e.g., LVs A, B and C) become idle and SG1's devices (e.g., LVs D, E, and F) are very busy having a high workload with high I/O activity relative to SG2. Further, assume that AP1 504 is updated to as follows: SATA 100%, FC 100%, Flash 100%. In this case, storage may be partitioned as illustrated in 520 where all of SG1's data is located all in flash and all of SG2's data is located in FC and SATA due to the relative workload differences. The optimizer has the flexibility to relocate data of SG1 to the highest performance storage tier of flash when not needed for SG2. The techniques herein provide flexibility so that when a first SG is busier than a second, the system has the ability to allocate more of a higher performance storage tier for the first SG's data. When the first SG's workload decreases, then the system may move the first SGs data to another storage tier in accordance with the maximum threshold percentages of the AP associated with the first SG. Overall, the techniques herein provide for defining an AP with flexibility in allocation by specifying percentages which total more than 100% of an SG's actual capacity. In such a case, there is flexibility in storage tier partitioning and allocation for the SG. If the AP allows for a particular partitioning that the optimizer determines is beneficial to the SG and/or overall data storage system performance, the partitioning may be selected and may also result in movement of the SG's data to a higher tier. Whether to select a particular storage allocation or partitioning may be determined by performing a cost-benefit analysis including any costs associated with data movement between tiers, benefit to the individual SGs and overall data storage system performance.

In connection with the techniques herein, an application's data may be defined as an SG associated with an AP. The AP may define in percentages what is the capacity upper limit or maximum threshold the application can use from each tier. The total of the foregoing percentages across all tiers can be more than the storage capacity of the application. Using the maximum thresholds for the storage tiers instead of fixed allocations alleviates a need for accurately specifying storage allocations for the tiers such as for expensive high performance flash drives. The techniques herein with the flexible maximum thresholds allow the system a variety of optimization options based on workload and other criteria while not requiring reservation of storage for an application whether the application is able to efficiently use such storage or not.

Additionally, the techniques herein allow for a variety of different criteria including priority to be used in connection with determining how to allocate or partition storage from the different tiers for use by multiple applications. For example, if a decision of how to partition storage is based only on workload so that the "busiest" devices having the highest I/O activity are placed on the highest performing tiers, a single application's data may consume an entire uppermost storage tier, such as all of a flash tier. This may be undesirable, for example, where the single application may not be as important to the user as other applications. In this case, an application's priority may be used as a factor when deciding how to partition storage of the multiple tiers. For example, reference is made back to FIG. 10 where SG1 502 may correspond to the data of a backup application with a LOW priority and its devices at time t=2 may be the busiest in the system. However, a database application (having its data correspond to SG2 506) may have a HIGH priority. Due the HIGH priority of SG2, a decision may be made to place at least some of the data from SG2 on flash despite SG1 having the devices with the higher workload. It should be noted that a minimum threshold may also be used to specify a lower bound on the capacity for a given tier to ensure that a minimum amount of the database application's data is located on flash. For example, element 508 may include a lower threshold for the flash tier so that at least this minimum amount of storage is allocated for use by SG2.

Use of the flexible maximum thresholds allows for partitioning tiers among the various applications where the optimizer can automatically make partitioning decisions based on an evaluation of what is most beneficial for a set of criteria. Generally, for a tier, an amount allocated for an SG or application may be represented as a function of one or more criteria including maximum thresholds from an AP, minimum thresholds from an AP, current workload, priority, and also other criteria. An embodiment may also include a time factor or criteria when evaluating different storage tier partitioning possibilities. For example, the criteria may include an indicator which weights one or more other factors depending on the time of day, week, month, and the like, analysis is performed to partition storage. To further illustrate, if an application is busy at a particular time of the month or year (e.g., such as a tax or financial application during the few weeks prior to tax or other filing deadlines), a weighting factor may be added to increase the amount of storage allocated for the highest performing tier (e.g., flash). For example, the maximum threshold specified for the flash tier1 may be multiplied by a value greater than 1 based on the application's priority.

An embodiment may evaluate the criteria described herein with a different level of importance or weight given to each that may vary with embodiment and the particular usage of each criteria. For example, an embodiment may give greater importance or weight to application priority over workload, may use priority to weight one or more other criteria, and the like.

Figure 11:
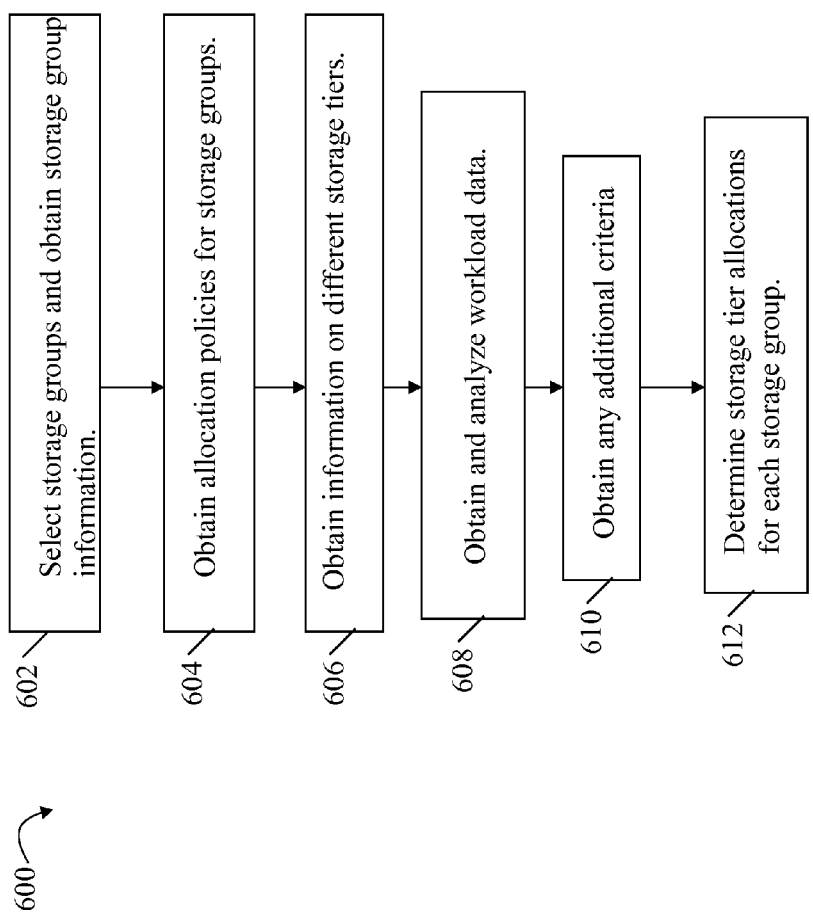
FIG. 11 is a flowchart summarizing processing steps that may be performed in an embodiment in accordance with techniques herein.

Referring to FIG. 11, shown is a flowchart of processing steps that may be performed in an embodiment in accordance with techniques herein. The flowchart 600 summarizes processing described above. At step 602, the SGs for which partitioning is performed are selected. Additionally, information about the selected SGs is obtained as may be included in SG definitions. Such SG information may include, for example, a priority for each SG and which devices such as LVs are included in each SG. At step 604, one or more APs associated with the selected SGs are obtained. Each AP includes one or more thresholds as described above. At step 606, information on the different storage tiers associated with the APs and SGs is obtained. Storage tier information may include total capacity for each tier as well as other information that may be used in subsequent processing. At step 608, workload data for the selected SGs is obtained and analyzed. As described herein, the workload data may be generally any one or more measurements used to characterize the current I/O rates or level of how busy the devices of the SGs are. At step 610, any additional criteria used in performing the storage tier partitioning or allocated is obtained. At step 612, storage tier allocated are determined for each storage groups. Step 612 may include an optimizer evaluating the particular criteria including the APs, workloads, and the like, as described herein.

The steps of flowchart 600 may be performed initially and then repeated periodically to re-evaluate a current partitioning. The method may be performed, for example, in response to an occurrence of a selected event, user initiated action, and the like.

Data used in connection with techniques herein, such as the performance data of FIG. 3 used in determining device and SG workloads, may be obtained through observation and monitoring actual performance. Data may also be determined in other suitable ways such as, for example, through simulation, estimation, and the like. Observed or collected data may be obtained as described in connection with FIG. 3 by monitoring and recording one or more aspects of I/O activity for each LV. For example, for each LV, an average number of reads occurring within a given time period may be determined, an average number of writes occurring within a given time period may be determined, an average number of read misses occurring within a given time period may be determined, and the like. It should be noted that the operations of read and write with respect to an LV may be viewed as read and write requests or commands from the DA, controller or other backend physical device interface. Thus, these are operations may also be characterized as a average number of operations with respect to the physical storage device (e.g., average number of physical device reads, writes, and the like, based on physical device accesses). This is in contrast to observing or counting a number of particular type of I/O requests (e.g., reads or writes) as issued from the host and received by a front end component such as an FA. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an FA.

It should be noted that movement of data between tiers from a source tier to a target tier may include determining free or unused storage device locations within the target tier. In the event there is an insufficient amount of free of unused storage in the target tier, processing may also include displacing or relocating other data currently stored on a physical device of the target tier. An embodiment may perform movement of data to and/or from physical storage devices using any suitable technique. Also, any suitable technique may be used to determine a target storage device in the target tier where the data currently stored on the target is relocated or migrated to another physical device in the same or a different tier. An embodiment may use, for example, the techniques described in U.S. patent application Ser. No. 12/586,925, filed Sep. 29, 2009, TECHNIQUES FOR PERFORMING DATA MIGRATION, which is incorporated by reference herein. An embodiment may also use any suitable technique to evaluate the cost-benefit of any data movement, migration, swap, and the like.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices, one or more types of SSDs, and the like. The tiers may also include other types of SSDs besides flash devices.

An embodiment in accordance with techniques herein may provide for automated evaluation to partition or allocate physical devices of particular storage tiers in a multi-tier storage environment among a plurality of applications. The techniques may make such determinations in accordance with criteria included in a storage allocation policy. Additionally, other criteria may be used in combination with the storage allocation policy to perform this partitioning. Such criteria may also include any one or more of a priority, one or more performance metrics, and the like. An embodiment in accordance with the techniques herein may also provide for automated movement of data across or between different storage tiers as may be needed based on changing workload. Additionally, once a tier is determined, other techniques may be used to determine which particular data of the application (e.g., which one or more LVs in a storage group) to store on physical devices of a particular tier. Furthermore, an embodiment may also use other techniques for load balancing among different physical storage devices in the same tier.

As mentioned above, an embodiment may be use the techniques described herein alone or in combination with other techniques. For example, an embodiment may use the techniques described herein alone, or in combination with a technique to evaluate which device's data should reside on physical storage of different tiers based on performance goals. For example, an embodiment may use the techniques herein in combination with the techniques described in U.S. patent application Ser. No. 12/803,571, filed on Jun. 30, 2010, (now U.S. Pat. No. 8,566,553) TECHNIQUES FOR AUTOMATED EVALUATION AND MOVEMENT OF DATA BETWEEN STORAGE TIERS, which is incorporated by reference herein, for performing a determination based on performance goals in evaluating whether to locate data in a flash or non-flash-based storage tier.

In an embodiment, the techniques described herein may be used in connection with a Fully Automated Storage Tiering (FAST) product produced by EMC Corporation of Hopkinton, Mass., that provides for the optimization of the use of different storage tiers including the ability to easily create and apply tiering policies to transparently automate the control, placement, and movement of data within a storage system based on business needs. An embodiment may also use techniques described in U.S. patent application Ser. No. 12/798,097, filed Mar. 30, 2010, ANALYSIS TOOL FOR A MULTI-TIER STORAGE ENVIRONMENT, which is incorporated by reference herein.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for partitioning storage of a data storage system comprising:
selecting a plurality of storage groups associated with a plurality of allocation policies, each of said plurality of storage groups including one or more logical devices and being associated with one of the plurality of allocation policies, wherein said one allocation policy associated with said each storage group includes a first threshold specifying a maximum amount of storage of a first of a plurality of storage tiers of physical storage devices used for storing data of said each storage group associated with said one allocation policy, said first storage tier having a highest performance ranking of the plurality of storage tiers;
analyzing I/O workload data for said plurality of storage groups, wherein said I/O workload data includes any of I/O throughput and response time; and
partitioning storage of the plurality of storage tiers for use in storing data of logical devices included in said plurality of storage groups in accordance with criteria, said criteria including I/O workloads as indicated by the I/O workload data of said plurality of storage groups, priorities of said plurality of storage groups, and said plurality of allocation policies associated with said plurality of storage groups, wherein a first of the plurality of allocation policies is specified for a first of the plurality of storage group, said first allocation policy including a first weight denoting an amount by which to increase the first threshold for the first storage tier for the first storage group during a specified time period when workload of the first storage group is expected to be higher than at points in time other than the specified time period.

2. The method of claim 1, wherein each of said storage groups includes logical devices of data used by an application.

3. The method of claim 1, wherein said one allocation policy includes said first threshold specifying said maximum amount of the first storage tier and includes another threshold that is a minimum threshold specifying a minimum amount of storage of the first storage tier.

4. The method of claim 1, wherein each of said allocation policies indicates a storage capacity range of said first storage tier, said storage capacity range being a range of values from zero up to said maximum amount specified by the first threshold, and wherein said partitioning allocates an amount of said first storage tier for use by each storage group associated with said each allocation policy which is in the storage capacity range.

5. The method of claim 1, wherein said plurality of storage tiers includes said first storage tier of one or more flash memory devices and a second storage tier of one or more physical devices having lower performance characteristics than said one or more flash memory devices.

6. The method of claim 1, wherein said first threshold is a percentage of a total storage capacity of said each storage group.

7. The method of claim 1, wherein said first threshold is a percentage of a total storage capacity of said first storage tier.

8. The method of claim 1, wherein said first threshold is an integer indicating an amount of storage units.

9. The method of claim 1, wherein the first allocation policy is associated with at least two of said plurality of storage tiers and includes at least two maximum thresholds corresponding to said at least two plurality of tiers, said first threshold being one of said at least two maximum thresholds.

10. The method of claim 9, wherein a sum of the at least two maximum thresholds for said at least two plurality of tiers represents a storage capacity which is more than a storage capacity of a storage group associated with said first allocation policy.

11. The method of claim 1, wherein said method is performed periodically to repartition storage of said plurality of storage tiers of the data storage system among said plurality of storage groups.

12. The method of claim 1, wherein, as a result of said partitioning, data of a first logical device of one of said storage groups is moved from a physical device of said first storage tier to another physical device included in a second of the plurality of storage tiers.

13. The method of claim 1, wherein the first weight for the first storage policy denotes a multiplicative factor applied to the first threshold of the first tier for the specified time period.

14. A system comprising:
a processor; and
a memory comprising code stored thereon that, when executed, performs a method for partitioning storage of a data storage system comprising:
selecting a plurality of storage groups associated with a plurality of allocation policies, each of said plurality of storage groups including one or more logical devices and being associated with one of the plurality of allocation policies, wherein said one allocation policy associated with said each storage group includes a first threshold specifying a maximum amount of storage of a first of a plurality of storage tiers of physical storage devices used for storing data of said each storage group associated with said one allocation policy, said first storage tier having a highest performance ranking of the plurality of storage tiers;

analyzing I/O workload data for said plurality of storage groups, wherein said I/O workload data includes any of I/O throughput and response time; and partitioning storage of the plurality of storage tiers for use in storing data of logical devices included in said plurality of storage groups in accordance with criteria, said criteria including I/O workloads as indicated by the I/O workload data of said plurality of storage groups, priorities of said plurality of storage groups, and said plurality of allocation policies associated with said plurality of storage groups, wherein a first of the plurality of allocation policies is specified for a first of the plurality of storage group, said first allocation policy including a first weight denoting an amount by which to increase the first threshold for the first storage tier for the first storage group during a specified time period when workload of the first storage group is expected to be higher than at points in time other than the specified time period.

15. A non-transitory computer readable medium comprising code stored thereon that, when executed, performs a method for partitioning storage of a data storage system comprising:

selecting a plurality of storage groups associated with a plurality of allocation policies, each of said plurality of storage groups including one or more logical devices and being associated with one of the plurality of allocation policies, wherein said one allocation policy associated with said each storage group includes a first threshold specifying a maximum amount of storage of a first of a plurality of storage tiers of physical storage devices used for storing data of said each storage group associated with said one allocation policy, said first storage tier having a highest performance ranking of the plurality of storage tiers;

analyzing I/O workload data for said plurality of storage groups, wherein said I/O workload data includes any of I/O throughput and response time; and partitioning storage of the plurality of storage tiers for use in storing data of logical devices included in said plurality of storage groups in accordance with criteria, said criteria including I/O workloads as indicated by the I/O workload data of said plurality of storage groups, priorities of said plurality of storage groups, and said plurality of allocation policies associated with said plurality of storage groups, wherein a first of the plurality of allocation policies is specified for a first of the plurality of storage group, said first allocation policy including a first weight denoting an amount by which to increase the first threshold for the first storage tier for the first storage group during a specified time period when workload of the first storage group is expected to be higher than at points in time other than the specified time period.

16. The computer readable medium of claim 15, wherein each of said storage groups includes logical devices of data used by an application.

17. The computer readable medium of claim 15, wherein said first threshold is a maximum threshold specifying a maximum amount of storage of the first storage tier.

18. The computer readable medium of claim 15, wherein said one allocation policy includes said first threshold specifying said maximum amount of the first storage tier and includes another threshold that is a minimum threshold specifying a minimum amount of storage of the first storage tier.

19. The computer readable medium of claim 15, wherein each of said allocation policies indicates a storage capacity range of said first storage tier, said storage capacity range being a range of values from zero up to said maximum amount specified by the first threshold, and wherein said partitioning allocates an amount of said first storage tier for use by each storage group associated with said each allocation policy which is in the storage capacity range.

20. The computer readable medium of claim 15, wherein said plurality of storage tiers includes said first storage tier of one or more flash memory devices and a second storage tier of one or more physical devices having lower performance characteristics than said one or more flash memory devices.

* * * * *